United States Patent
Kumar et al.

(10) Patent No.: US 9,773,165 B2
(45) Date of Patent: *Sep. 26, 2017

(54) METHOD AND SYSTEM FOR WEBPAGE REGRESSION TESTING

(71) Applicant: III HOLDINGS 1, LLC, Wilmington (DE)

(72) Inventors: Krishna Bihari Kumar, Phoenix, AZ (US); Keshav A. Narsipur, Phoenix, AZ (US); Hans-Jergen Greiner, Phoenix, AZ (US)

(73) Assignee: III Holdings 1, LLC, Wilmington, DE (US)

( * ) Notice: Subject to any disclaimer, the term of this patent is extended or adjusted under 35 U.S.C. 154(b) by 420 days.

This patent is subject to a terminal disclaimer.

(21) Appl. No.: 14/170,012

(22) Filed: Jan. 31, 2014

(65) Prior Publication Data

US 2014/0147051 A1    May 29, 2014

Related U.S. Application Data

(63) Continuation of application No. 13/173,132, filed on Jun. 30, 2011, now Pat. No. 8,682,083.

(51) Int. Cl.
*G06K 9/52* (2006.01)
*G06K 9/00* (2006.01)
(Continued)

(52) U.S. Cl.
CPC ...... *G06K 9/00442* (2013.01); *G06F 11/3688* (2013.01); *G06K 9/6202* (2013.01)

(58) Field of Classification Search
CPC ............ G06F 11/3688; G06F 11/3684; G06F 11/368; G06F 11/30; G06F 11/3672; G06F 17/30371; G06F 8/71
See application file for complete search history.

(56) References Cited

U.S. PATENT DOCUMENTS 6,138,270 A    10/2000 Hsu
6,226,407 B1    5/2001 Zabihe et al.
(Continued)

OTHER PUBLICATIONS

International Search Report and Written Opinion dated Sep. 17, 2012 in Application No. PCT/US2012/044823.
(Continued)

*Primary Examiner* — Jonathan S Lee
(74) *Attorney, Agent, or Firm* — Meyertons, Hood, Kivlin, Kowert & Goetzel, P.C.

(57) ABSTRACT

A regression testing system comprises an automatic test tool configured to capture a first web screen shot and a second web screen shot of a webpage, where the webpage has undergone an update or edit. The regression testing system also comprises a visual comparator configured to identify similar areas in the first web screen shot and the second web screen shot. The visual comparator receives, and compares characteristics of, the web screen shots. Furthermore, the regression testing system generates a report with marked different characteristics between the first and second web screen shots. The regression testing system identifies similar areas in the first and second web screen shots shot even if the similar areas are at different locations within the web screen shots. The comparison performed by the visual comparator includes performing a pixel comparison combined with a marking algorithm to group differences in smaller, related but separate areas.

18 Claims, 7 Drawing Sheets

(51) Int. Cl.
*G06K 9/62* (2006.01)
*G06F 11/36* (2006.01)

(56) References Cited

U.S. PATENT DOCUMENTS

| | | | |
|---|---|---|---|
| 6,490,696 B1* | 12/2002 | Wood | G06F 11/3688 714/38.1 |
| 6,523,027 B1 | 2/2003 | Underwood | |
| 6,907,546 B1 | 6/2005 | Haswell et al. | |
| 8,381,094 B1 | 2/2013 | Prasad et al. | |
| 9,075,918 B1* | 7/2015 | Chandra | G06F 11/3684 |
| 9,417,867 B2* | 8/2016 | Abuelsaad | G06F 8/70 |
| 2004/0068340 A1 | 4/2004 | Mayberry | |
| 2005/0188357 A1 | 8/2005 | Derks et al. | |
| 2005/0204298 A1 | 9/2005 | Kemp | |
| 2005/0262430 A1 | 11/2005 | Croft | |
| 2006/0036958 A1 | 2/2006 | Dreher | |
| 2006/0132480 A1 | 6/2006 | Muller | |
| 2007/0055655 A1 | 3/2007 | Bernstein et al. | |
| 2008/0109790 A1* | 5/2008 | Farnham | G06F 11/3688 717/128 |
| 2008/0127092 A1 | 5/2008 | Tomar | |
| 2008/0127103 A1 | 5/2008 | Bak | |
| 2008/0310736 A1 | 12/2008 | Chattopadhyay et al. | |
| 2009/0100345 A1 | 4/2009 | Miller | |
| 2009/0161949 A1 | 6/2009 | Milov | |
| 2009/0196497 A1 | 8/2009 | Pankratius | |
| 2009/0217303 A1 | 8/2009 | Grechanik et al. | |
| 2009/0235172 A1 | 9/2009 | Gandhi et al. | |
| 2009/0260079 A1 | 10/2009 | Anbo | |
| 2009/0282071 A1* | 11/2009 | Roden | G06F 11/3688 |
| 2009/0288070 A1 | 11/2009 | Cohen et al. | |
| 2009/0324075 A1 | 12/2009 | Shiiyama | |
| 2010/0027893 A1 | 2/2010 | Hayber | |
| 2010/0211893 A1 | 8/2010 | Fanning et al. | |
| 2010/0269090 A1 | 10/2010 | Le Merrer | |
| 2010/0322523 A1 | 12/2010 | Mitsuhashi et al. | |
| 2011/0016452 A1* | 1/2011 | Gorthi | G06F 11/3688 717/124 |
| 2012/0198351 A1* | 8/2012 | Lee | G06F 17/30861 715/744 |
| 2012/0243745 A1 | 9/2012 | Amintafreshi | |
| 2013/0019171 A1* | 1/2013 | Mounty | G06F 11/3688 715/704 |
| 2014/0068464 A1* | 3/2014 | Howard | G06F 3/0482 715/753 |
| 2015/0161088 A1* | 6/2015 | Kamada | G06F 17/2247 715/235 |
| 2016/0062876 A1* | 3/2016 | Narayanan | G06F 11/3684 717/130 |
| 2016/0209996 A1* | 7/2016 | Spiegel | G06F 3/0482 715/745 |

OTHER PUBLICATIONS

International Preliminary Report on Patentability dated May 24, 2013 in Application No. PCT/US2012/044823.
Jung, H., Lee, S., and Baik, O.K., An Image Comparing-Based GUI Software Testing Automation System, 2012, WORLDCOMP '12, pp. 1-5.
Ko, A. and Myers, B.A., Finding Causes of Program Output with the Java Whyline, 2009, CHI, pp. 1569-1578.
Ko, A.J. and Myers, B.A., Extracting and Answering Why and Why Not Questions about Java Program Output, 2010, ACM Transactions on Software Engineering and Methodology, vol. 20, No. 2, pp. 4:1-4:36.
Lim, B.Y. and Dey, A.K., Toolkit to Support Intelligibility in Context-Aware Applications, 2010, UbiComp, pp. 13-22.
Memon, A.M., Automatically Repairing Event Sequence-Based GUI Test Suites for Regression Testing, 2007, ACM Transactions on Computational Logic, pp. 1-35.
Raneburger, D., Interactive Model Driven Graphical User Interface Generation, 2010, EICS'1 0, pp. 321-324.
Perugini, S., HTML versus XML, 2003, Computer Science Dept: VA Tech.
Chang, T.H., Yeh, T., and Miller, R.C., GUI Testing Using Computer Vision, 2010, CHI 2010: Pixels and Perception, pp. 1535-1544.
Yeh, T., Chang, T.H., and Miller, R.C., Sikuli: Using GUI Screenshots for Search and Automation, 2009, Proceedings of the 22nd Annual ACM symposium on User interface software and technology, pp. 183-192.
USPTO; Final Rejection Office Action dated Aug. 26, 2013 in U.S. Appl. No. 13/173,132.
USPTO; Notice of Allowance and Fee(s) Due dated Nov. 7, 2013 in U.S. Appl. No. 13/173,132.
USPTO; Office Action dated Mar. 14, 2013 in U.S. Appl. No. 13/173,132.

* cited by examiner

300

| File  Edit  View  History  Bookmarks  Favorites  Tools  Help |

XYZ CREDIT CARD
Already a card member? If yes, the credit card application will be shorter. ○ Yes  ⊙ No First Name: [          ]          Last Name: [          ]
Middle Initial: [          ]       Name on Card: [          ]
Home Street Address: [          ]  Home Apt/ Suite#: [          ]
Home Zip Code: [          ]       Home Phone Number: [  ][  ][  ]
Do you:  ⊙ Own?  ○ Rent?          E-mail Address: [          ]
Date of Birth: [  ][  ][  ]       Social Security Number: [  ][  ][  ]

Annual Household Income: $ [          ]     Income Source: [          ▽]

Do You Have A (check all that apply): ☐ Checking account?  ☐ Money Market/ Savings?

☑ Additional Cards
Share the benefits of XYZ with Additional cards with no annual fee. Please issue Additional card(s) to the following individual(s) age 21 and over.

☐ Yes! I want to protect my account by enrolling in the OPTIONAL Account Protector Program from XYZ. I have read the Program Summary (see Terms and Conditions).
Account Protector Program <u>Terms and Conditions</u>

By submitting this application, I certify that I have read, met and agreed to all the terms, conditions and disclosures which contain rate, fee and other important information. I understand that the annual card fee will be waived for the first year, then $AB.

XYZ CREDIT CARD
Already a card member? If yes, the credit card application will be shorter.  ○ Yes  ◉ No

| | | | |
|---|---|---|---|
| First Name: | | Last Name: | |
| Middle Initial: | | Name on Card: | |
| Home Street Address: | | Home Apt/ Suite#: | |
| Home Zip Code: | | Home Phone Number: | |
| Do you: | ○ Own?  ◉ Rent? | E-mail Address: | |
| Date of Birth: | | Social Security Number: | |

Annual Household Income: $ [    ]   Income Source: [    ▽]

Do You Have A (check all that apply): ☐ Checking account?  ☐ Money Market/ Savings?

☑ Additional Cards
Share the benefits of XYZ with Additional cards with no annual fee. Please issue Additional card(s) to the following individual(s) age 15 and over.

☐ Yes! I want to protect my account by enrolling in the OPTIONAL Account Protector Program from XYZ. I have read the Program Summary (see Terms and Conditions).
Account Protector Program <u>Terms and Conditions</u>

By submitting this application, I certify that I have read, met and agreed to all the terms, conditions and disclosures which contain rate, fee and other important information. I understand that the annual card fee will be waived for the first year, then $ .

SHIFT 502; suggested vertical shift

XYZ CREDIT CARD
Already a card member? If yes, the credit card application will be shorter. ○ Yes  ⦿ No

| First Name: | | Last Name: | |
| Middle Initial: | | Name on Card: | |
| Home Street Address: | | Home Apt/ Suite#: | |
| Home Zip Code: | | Home Phone Number: | |
| Do you: | ○ Own?  ⦿ Rent? | E-mail Address: | |
| Date of Birth: | | Social Security Number: | |

BUTTON SELECTION CHANGE 512; suggested button selection change

Annual Household Income: $ [    ]     Income Source: [    ▽]

STYLE CHANGE 504; suggested style change

Do You Have A (check all that apply): ☐ Checking account?  ☐ Money Market/ Savings?

☑ Additional Cards
Share the benefits of XYZ with Additional cards with no annual fee. Please issue Additional card(s) to the following individual(s) age 15 and over.

VALUE CHANGE 506; suggested value change

☐ Yes! I want to protect my account by enrolling in the OPTIONAL Account Protector Program from XYZ. I have read the Program Summary (see Terms and Conditions).
Account Protector Program Terms and Conditions

COLOR CHANGE 508; suggested color change

By submitting this application, I certify that I have read, met and agreed to all the terms, conditions and disclosures which contain rate, fee and other important information. I understand that the annual card fee will be waived for the first year, then $ [ ]

MISSING VALUE 510; suggested a value

FIG. 5

METHOD AND SYSTEM FOR WEBPAGE REGRESSION TESTING

CROSS-REFERENCE TO RELATED APPLICATIONS

This application is a continuation of, claims priority to and the benefit of, U.S. Ser. No. 13/173,132 filed Jun. 30, 2011 and entitled "METHOD AND SYSTEM FOR WEBPAGE REGRESSION TESTING," which is incorporated herein in its entirety.

FIELD OF INVENTION

The present disclosure generally relates to webpage testing, and more particularly, to methods, systems, and computer readable mediums for performing webpage regression testing.

BACKGROUND OF THE INVENTION

Product/service providers, hereinafter collectively referred to as "service providers", extensively use web pages for providing product/service information, online services, company information, facilitating transactions, online support, and/or the like. Over a period of time, the service providers may need to update or modify their web applications underlying the web pages to accommodate new or modified business requirements. Such modifications in the web applications may cause unexpected visual changes in the appearance of a web page. The service providers may not want such unexpected visual changes in the web pages. This creates a new challenge for testing professionals as currently available software testing tools are only capable of determining whether data on modified web pages are correct and do not test visual appearance of the web pages for modification. One conventional approach to overcome the aforementioned challenge requires a testing professional to manually compare web pages prior to and after the incorporation of an update or modification to the web applications underlying the web pages. Such manual comparison results in a loss of productive time. Further, such comparison may be prone to errors.

One currently available comparison tool uses color histogram for comparing web pages before and after incorporating the changes in the application. However, such a tool cannot identify a change in the modified webpage in comparison with the original webpage if the web pages under test produce similar color histograms. Another tool currently available discloses a use of pixel comparison for determining changes in the web pages. However, such tools can merely determine that the web pages are different and cannot identify the nature of change or location of change in the modified web page, such as, for example, change in fonts, modified placement of web components, links within the webpage and/or the like. Consequently, the testing professionals have to spend a lot of time comparing web pages manually to identify the changes and their locations in the modified web page. Thus, there is a need for a method, system and/or program for testing web pages in a more accurate and efficient manner.

SUMMARY OF THE INVENTION

The present disclosure meets the above-identified need by providing methods and systems configured to perform webpage regression testing. In one embodiment, a regression testing system comprises an automatic test tool configured to capture a first web screen shot and a second web screen shot of a webpage, where the webpage has undergone an update or edit. The regression testing system also comprises a visual comparator configured to identify similar areas in the first web screen shot and the second web screen shot. The visual comparator receives the first web screen shot and the second web screen shot from the automatic test tool, and compares characteristics of the first and second web screen shots. Furthermore, the regression testing system generates a report with marked different characteristics between the first web screen shot and the second web screen shot. The report may be generated in HTML.

The regression testing system identifies the same or similar areas in the first web screen shot and the second web screen shot even if the similar areas are at different locations within the web screen. The comparison performed by the visual comparator includes performing a pixel comparison combined with a marking algorithm to group differences in smaller, related but separate areas. The characteristics used during the comparison process may include at least one of color, element positioning, style, and content.

Furthermore, in one embodiment, the visual comparator compares a first rectangular area of the first web screen shot to a second rectangular area of the second web screen shot. The first rectangular area and the second rectangular area are shifted during the comparison process and a percentage difference is determined. The rectangular sizes of the rectangular areas may be determined by performing a pixel-to-pixel comparison of the first web screen shot to the second web screen shot, and forming a rectangular size around a grouping of pixel discrepancies. In another embodiment, the regression testing system is further configured to provide suggestions of image area relocation in order to increase matching of the first web screen shot and the second web screen shot.

Additionally, in an exemplary method, a webpage regression testing method comprises capturing, by an automatic test tool, a first web screen shot of a webpage, implementing a webpage update to the webpage, and capturing, by the automatic test tool, a second web screen shot of the webpage. A visual comparator receives the first web screen shot and the second web screen shot from the automatic test tool. The regression testing method further includes comparing, by the visual comparator, characteristics of the first web screen shot and the second web screen shot, marking different characteristics between the first web screen shot and the second web screen shot, and generating a report of the marked different characteristics. The comparing of the first web screen shot and the second web screen shot may include comparing visual changes occurring after the webpage update.

Furthermore, the webpage regression testing method may include comparing a first rectangular area of the first web screen shot to a second rectangular area of the second web screen shot, and comparison shifting the first rectangular area and the second rectangular area and determining the percentage difference. It may also include determining the rectangular size of the first rectangular area and the second rectangular area, wherein the determining the rectangular size comprises performing a pixel-to-pixel comparison of the first web screen shot to the second web screen shot, and forming a rectangular size around a grouping of pixel discrepancies. To achieve the comparison, the virtual comparator may include performing iterations of the comparison shifting of the first rectangular area and the second rectangular area until a match is made, and marking the differences in the second web screen shot for rectangular areas for which a match is not found. Furthermore, the automatic test tool may be a commercial off the shelf (COTS) software program. Correspondingly, the visual comparator may be a Java application programming interface (API). Furthermore, the process may include configuring parameters to optimize performance of the visual comparator.

Further features and advantages of the present disclosure as well as the structure and operation of various embodiments are described in detail below with reference to the accompanying drawings.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and:

FIG. 3 illustrates a first web screen shot, according to an exemplary embodiment;

FIG. 4 illustrates a second web screen shot, according to an exemplary embodiment;

FIG. 5 illustrates an exemplary embodiment of a second web screen shot with marked differences and suggestions;

DETAILED DESCRIPTION

Figure 1:
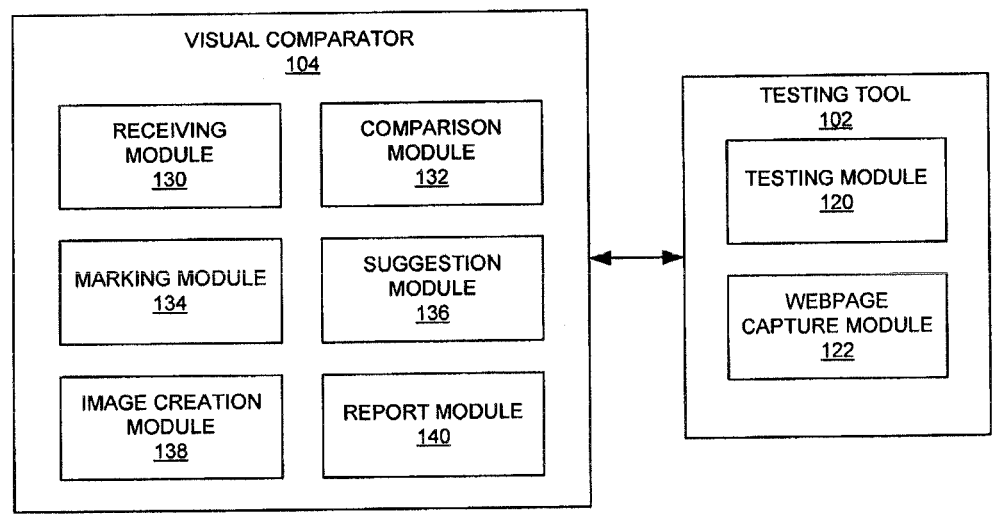
FIG. 1 is an overview of an exemplary system for webpage regression testing, in accordance with various embodiments of the present disclosure.

The detailed description of exemplary embodiments herein makes reference to the accompanying drawings and figures, which show the exemplary embodiments by way of illustration only. While these exemplary embodiments are described in sufficient detail to enable those skilled in the art, it should be understood that other embodiments may be realized and that logical and mechanical changes may be made without departing from the spirit and scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present disclosure is described herein with reference to block diagrams and flowchart illustrations of methods, and computer program products according to various aspects. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

"Testing professional" may include any individual, user, employee, contractor, group, and/or other entity that creates, revises, tests, implements, or modifies software and/or hardware related to the visual comparator and associated components.

"Web construction logic"—may include an understanding of how a web page is constructed or rendered, such as a web page being constructed using rectangular building blocks and each element on page is rendered as rectangle.

"Pixel discrepancies"—may denote differences in the value of Red, Green, Blue and/or Alpha between pixels at same location in two images The present disclosure is now described in terms of an exemplary system, in which various embodiments would be implemented. It will be apparent to one skilled in the relevant art(s) that the above disclosure has been described by way of illustration and not limitation, and may be implemented in alternate embodiments.

FIG. 1 is an overview of an exemplary computer-based system 100 for regression testing, in accordance with various embodiments of the present disclosure. Computer-based system 100 includes a testing tool 102 and a visual comparator 104. Testing tool 102 and visual comparator 104 may be programmatically coupled to each other directly, through a network, or both.

Testing tool 102 tests quality and/or reliability of software applications. In one example implementation, testing tool 102 may include a testing module 120 and a webpage capture module 122. Testing module 120 may be an automatic testing tool, such as a regression testing tool. In one embodiment, testing module 120 performs regression testing to identify errors (e.g., software regression) in functionalities of the software applications underlying the webpages, after incorporating modifications/updates to the software applications. Examples of such modifications/updates include functional enhancements, upgrades, configuration changes, patches, and/or the like. In one example implementation, testing module 120 launches a browser and executes test cases for the web applications. In one example, testing module 120 discussed herein can be a commercial off the shelf (COTS) software program such as a QuickTest-Professional (QTP®), Selenium® and/or the like. Alternatively, testing module 120 may be proprietary software developed for performing regression testing.

Webpage capture module 122 captures screen shots of web pages under test and may pass the screen shots to visual comparator 104 as images. In one example implementation, webpage capture module 122 may be an image capturing tool. Although webpage capture module 122 is described as a part of testing tool 102, one skilled in art can appreciate that webpage capture module 122 can be a separate unit programmatically coupled to testing tool 102. Alternatively, webpage capture module 122 may be integrated with visual comparator 104. Webpage capture module 122 captures a first screen shot of a webpage before a webpage update and a second web screen shot of the webpage after a webpage update.

Although, the disclosure describes testing tool 102 and visual comparator 104 as separate units, one skilled in art can appreciate that testing tool 102 and visual comparator 104 can be modified to be included in a single tool. In one example implementation, testing tool 102 and visual comparator 104 may be implemented in a single device. Alternatively, testing tool 102 and visual comparator 104 may be implemented in different devices and coupled to each other through a network, for example, an intranet, a Local Area Network (LAN), Internet or the like.

Visual comparator 104 performs webpage regression testing on the captured web screen shots. The webpage regression testing may include comparison of at least two captured web screen shots to identify and mark the differences in characteristics between the web screen shots caused due to a webpage update. Visual comparator 104 can identify and differentiate texts (glyphs representing characters in the images), font of the text, color of texts, font styles, missing values, numbers and/or the like in the web screen shots. Furthermore, visual comparator 104 can also identify change in component location, size, color, shape and/or the like in the web screen shots. For example, visual comparator 104 can identify similar images in the web screen shots placed at different location, having a different size and different colors. Additionally, visual comparator 104 can mark the differences in the web screen shot with suggestions for modifications. Furthermore, visual comparator 104 can also generate a report and a difference image illustrating the changes. In one example, visual comparator 104 may be implemented in Java using a Java Advanced Imaging application programming interface (API) to perform comparison between at least two captured web screen shots, and to generate a difference image, a result image and the report. In other examples, visual comparator 104 can be implemented using other platforms and/or languages. Examples of other platforms and/or languages include C, C++, .Net, PHP. Visual Basic, Visual C, and/or the like.

In one embodiment, visual comparator 104 may include a receiving module 130, a comparison module 132, a marking module 134, a suggestion module 136, an image creation module 138, and a report module 140, or a combination of these modules.

Receiving module 130 receives the first web screen shot and the second screen shot from webpage capture module 122. Comparison module 132 compares characteristics of the first web screen shot and the second web screen shot. Examples of the characteristics used by comparison module 132 may include at least one of color, content, element positioning, element size, transparency, font family, font size, font weight, font decoration (underline, strikethrough, etc) and/or the like. Comparison module 132 may perform the comparison using various techniques or combinations of various techniques, for example, using a pixel comparison technique and web analysis technique. In one example implementation, comparison module 132 may perform pixel to pixel comparison between the first web screen shot and the second web screen shot. Comparison module 132 may determine areas having pixel discrepancies in the first web screen shot and the second web screen shot. In one embodiment, comparison module 132 may group pixel discrepancies in smaller, related but separate areas. For example, comparison module 132 may identify one or more sets of pixel discrepancies belonging to a particular characteristic or element such as a text (glyph), an image and/or the like. Further, comparison module 132 may recognize each of the sets of the pixel discrepancies as distinct groups (hereinafter referred to as "groups"). More specifically, discrepancies may be grouped together based on the similarity of pixel discrepancies (e.g., color difference, transparency difference, magnitude of color difference, etc.) as well as the distance between pixels. Pixels with similar discrepancies and closer to each other may be grouped together. Although one example is provided herein for describing grouping, other forms of grouping are contemplated.

Further, comparison module 132 may form a first rectangular area encompassing, at least in part, a group of pixel discrepancies in the first web screen shot. Similarly, comparison module 132 may form a second rectangular area in the second web screen shot. In one embodiment, dimensions of second rectangular area may be same as the dimensions of the first rectangular area. In alternate embodiment, the dimensions of the second rectangular area may be different from the dimensions of the first rectangular area. Also, in one example implementation, comparison module 132 may allow a user to set a size of the first and second rectangular areas. Although, use of rectangular area is described herein for encompassing pixel areas, other forms of geometric/non-geometric shapes for encompassing pixel areas have been contemplated.

Comparison module 132 compares the first rectangular area and the second rectangular area. In one example implementation, comparison module 132 may use a pixel comparison method alone or in combination with web construction logic, to compare the first rectangular area and the second rectangular area. Comparison module 132 may perform pixel to pixel comparison between the first rectangular area and the second rectangular area. Comparison module 132 may identify content, such as for example, texts (glyphs representing characters in the images), font of the text, color of texts, font styles, missing values, numbers and/or the like in the first and the second web screen shots. Comparison module 132 may also perform content to content comparison to identify similar content with varying characteristics. For example, comparison module 132 may perform comparison between the texts of the rectangular areas to determine similarities or differences in content.

Comparison module 132 may also calculate percentage difference based upon the comparison. For example, the percentage difference may be calculated as a ratio, represented in percentages, of the number of pixels in discrepancy to the total number of pixels encompassed by the first rectangular area. Such combination of comparison techniques not only helps identifying similar content, but also helps identifying difference in characteristics. For example, comparison module 132 may identify the rectangular areas having the same text but different font and/or color.

In response to a successful match, comparison module 132 identifies locations of the first and second rectangular areas and places location information in memory. Otherwise, comparison module 132 shifts the position of the at least one of the first rectangular area or the second rectangular area to another location having pixel discrepancies in the corresponding screen shots and performs the comparison. In one example, comparison module 132 may shift the position of the second rectangular area to another area comprising pixel discrepancies of the second web screen shot while keeping the position the first rectangular area the same. In another example, comparison module 132 may shift the position of the first rectangular area to another area comprising pixel discrepancies of the first web screen shot while keeping the position the second rectangular area the same.

Comparison module 132 continues to perform shifting and comparison for all areas comprising pixel discrepancies in the first web screen shot and/or in the second web screen shot or until a match is found. In response to a successful match, comparison module 132 determines the locations of the first rectangular area and the second rectangular area as the locations of match and places the location information in memory.

In case of failure to find a match, comparison module 132 may modify the dimensions of at least one of the first rectangular area and the second rectangular area, and continues to perform the comparison, and shifting and comparing operation as described above. In one embodiment, modification of dimensions may be based on web construction logic and/or grouping of pixel discrepancies. For example, comparison module 132 may identify similar grouping pixels based on a characteristic, such as grouping based on image content or text and/or the like using web construction logic. Using the grouping information, comparison module 132 may identify similar groups in other web screen shots and may modify the dimensions of one of the first and the second rectangular areas. For example, comparison module 132 may modify the dimension of the first or the second rectangular area comprising a similar image in one of the screen shots based on dimension of similar group comprising an image in another screen shot. In response to a successful match, comparison module 132 may identify the locations of the first rectangular area and the second rectangular area as the locations of match and place location information in memory. This method of comparison enables identification of similar content with different sizes. For example, comparison module 132 can identify the same image having different sizes in the same or different locations in the web screen shots.

If this process ends without finding a match, comparison module 132 may conclude that there is no match or an element is missing, according to one embodiment. The above mentioned comparison method performed by the comparison module 132 is described in at least one part for one group of pixel discrepancy. The above mentioned method may be iterated for remaining parts of the same pixel group and other pixel groups in the web screen shots.

Based upon the comparison, marking module 134 marks differences in the characteristics between the first web screen shot and the second web screen shot. Marking module 134 may mark the location comprising differences in characteristics. For example, marking module 134 may mark a rectangular boundary around areas having pixel discrepancies. In one embodiment, marking module 134 may mark boundaries around identified distinct groups. Marking module 134 may be a graphical tool to visually create an impression around a boundary of different characteristics. Marking module 134 may mark the differences either in the first web screen shot or the second web screen shot or both.

Suggestion module 136 provides one or more suggestions to increase matching between the first web screen shot and the second web screen shot. Suggestion module 136 may use results of pixel comparison alone or in combination with the comparison method or web page construction logic to identify structural changes that can be performed on the second web screen shot to make the second web screen shot visually consistent with the first web screen shot. In one embodiment, comparison module 132 uses image region recognition techniques to identify underlying rectangular areas. According to one example, suggestion module 136 may suggest to relocate a webpage component, such as a form field, an image, a link, a text box and/or the like, from one position to another position. In another example, suggestion module 136 may suggest to add an image, remove an image, resize an image and/or the like. In yet another example, suggestion module 136 may suggest changing a font type, a font color, a font size, font content, and/or the like.

Image creation module 138 generates a result image having the differences between the first web screen shot and the second web screen shot. In one example implementation, image creation module 138 generates a replica of the differences alone in the result image.

Report module 140 generates a report of the marked different characteristics between the first web screen shot and the second web screen shot. In one example implementation, the report may be generated in a Hyper Text Markup Language (HTML) document, though the report may be generated in any other suitable document formats. The report may include information about the web pages for which webpage regression testing was performed, the result of webpage regression testing, locations of differences in characteristics, comments, hyperlink to the marked second web screen shot, and/or the like. In one example, the report may include fields, such as a record ID field, a differences field, a location of differences field, a result image field, a comment field and/or the like, providing details of webpage regression testing results.

Visual comparator 104 may further include at least one interface such as, for example, a command line interface (CLI), and graphical user interface (GUI) for the testing professional to configure various parameters to optimize performance thereof. One such parameter may be a dimension for comparison area (e.g., rectangular area). Another parameter may be maximum number of iterations that may performed by visual comparator 104 to ascertain a match between the first web page screen shot and the second web page screen shot.

Computer-based system 100 as described herein may be a data processing system such as, for example, a server, any suitable personal computer, network computer, workstation, minicomputer, mainframe or the like. Those skilled in art can appreciate that computer-based system 100 includes an operating system (e.g., Windows NT, 95/98/2000, OS2, UNIX, Linux, Solaris, MacOS, etc.) as well as various conventional support software and drivers typically associated with server/computer. Computer-based system 100 also includes one or more browsers (e.g., Internet Explorer®, Mozilla Firefox™, etc.) to display web pages. Computer-based system 100 may also include a database (not shown) to store web screen shots, corresponding web pages, web construction logic, results of webpage regression testing, result images, difference images and reports.

Furthermore, computer readable instructions of corresponding modules and tools may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Figure 2:
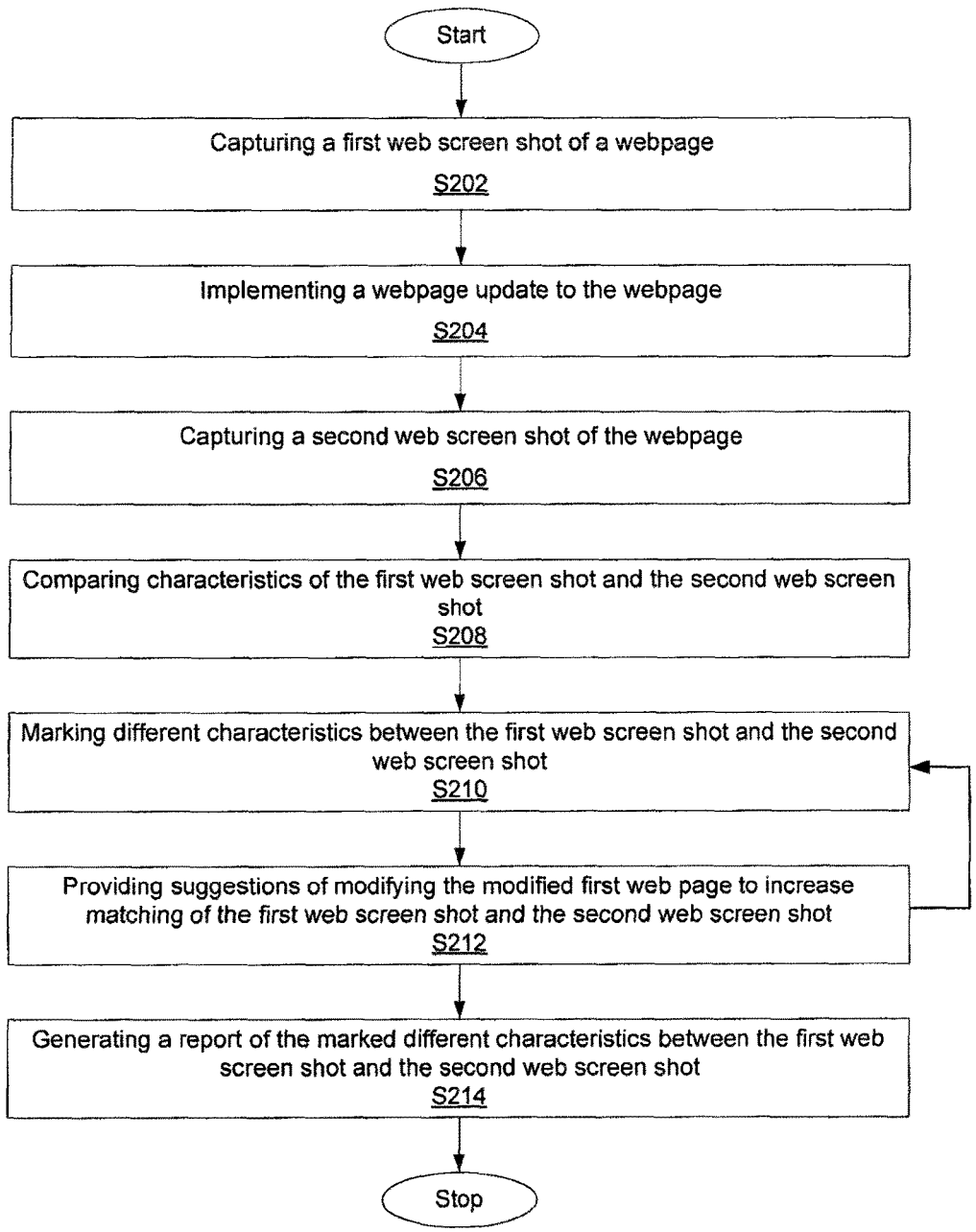
FIG. 2 is a flowchart illustrating one exemplary process of webpage regression testing.

FIG. 2 is a flowchart illustrating an exemplary process 200 for webpage regression testing, according to an embodiment of the present disclosure. In one embodiment, a computer-based system, such as computer-based system 100, performs various steps in process 200. In step S202, computer-based system 100 captures a first web screen shot of a webpage before performing an update to underlying web application. In step S204, computer-based system 100 implements a webpage update to the webpage. Computer-based system 100 may implement the webpage update as a part of a process of web application modification. In response to updating the webpage, computer-based system 100 captures a second web screen shot of the webpage in step S206. In one implementation, the first web screen shot and the second web screen shot are saved as images.

In step S208, the characteristics of the first web screen shot and the second web screen shot are compared to identify visual changes occurring as a result of the webpage update. The characteristics include color, content, element positioning, element size, transparency, font family, font size, font weight, font decoration (underline, strikethrough, etc.) and/or the like. Computer-based system 100 uses various techniques including a pixel comparison technique and web construction technique to perform characteristics comparison as described with respect to FIG. 1.

In response to completion of comparing characteristics of the first web screen shot and the second web screen shot, computer-based system 100, in step S210, marks the boundaries of one or more groups of pixels having pixel discrepancies, as a difference. In step S212, computer-based system 100 provides suggestions to modify the web page associated with the web screen shot to increase a match in visual appearance of the second web screen shot to the first web screen shot. For example, computer-based system 100 may suggest a change in font color for a text in a marked part of web screen shot, to match a font color of a text in a corresponding location of another web screen shot. In one exemplary implementation, the suggestions may be provided on the second web screen shot at locations of markings. Process 200 may perform multiple iterations between step S210 and step S212, with each iteration improving the match between the first web screen shot and the second web screen shot. In step S214, computer-based system 100 generates a report of marked different characteristics between the first web screen shot and the second web screen shot. In one exemplary implementation, the report is in HTML format. A person skilled in the art will appreciate that any other suitable format may also be used to generate the report.

While the steps outlined above represent a specific embodiment, practitioners will appreciate that there are any number of computing algorithms and user interfaces that may be applied to create similar results. The steps are presented for the sake of explanation only and are not intended to limit the scope in any way.

In an exemplary embodiment and with reference to FIG. 3, a first web screen shot 300 of a credit card application form is presented. The exemplary application form includes various data fields, such as, first name, last name, address, date of birth, phone number, email address, date of birth, annual income and/or the like, to enable a user to enter corresponding information. Furthermore, the application form may also include one or more checkboxes and/or radio buttons allowing the user to select various options.

In one example, one or more web applications underlying the first webpage may be modified to accommodate business requirements, security policies, customer policy, regulatory compliance issues, and/or the like. Updating in the web applications may result in visual changes to the webpage corresponding to first web screen shot 300. For example, a webpage update may render a webpage with changes in the location of webpage elements, change in fonts, missing values, change in values, and/or the like. Webpage capture module 122 captures a screen shot (i.e. the second web screen shot) of the updated webpage. An example of a second web screen shot 400 is shown in FIG. 4, according to one embodiment. In the current example, the webpage update has rendered few changes in visual appearances in the webpage. The differences in characteristics in the second web screen shot in comparison with characteristics in the first web screen shot are marked by marking module 134. An example screen shot of a marked second web screen shot 500 is illustrated in FIG. 5. The markings illustrate visual changes as a result of the webpage update. In current example, there are six (6) changes that are identified and marked by visual comparator 104 in the process of webpage regression testing.

As shown in FIG. 5, a difference characteristic may be marked by drawing a rectangle around a location on second web screen shot 400 corresponding to the difference characteristic. A person skilled in the art will appreciate that drawing a rectangle is only exemplary way of marking the difference characteristics and any other suitable technique, for example, drawing a circle around the difference characteristics, highlighting the area in a visible manner, pointing an arrow to the difference characteristics and/or the like, may be used instead of or in addition to it. In the current example, marked second web screen shot 500 shows six difference characteristics 502-512. Further, as shown, marked second web screen shot 500, may also optionally include suggestions corresponding to the marked difference characteristics provided by suggestion module 136.

Difference characteristic 502 indicates a shift in position of a starting point of the webpage after the webpage update. Marking module 134 may draw a rectangle around the area where the shift has occurred. Also, in a first embodiment, marking module 134 may mark the difference characteristic using a suitable label to enable the testing professional to identify a type of difference characteristic, as illustrated here with label "shift". Further, in a second embodiment, a corresponding suggested modification or action may be provided to the testing professional. For example, suggesting the testing professional perform a vertical shift of the second web screen shot to compensate for the shift in position consistent with the position of the first web screen shot.

Difference characteristic 504 indicates a change in font style of a text after the webpage update. In the current example, the font style has changed from normal text to bolded text. Marking module 134 may draw a rectangle around the text of which the font style has changed. Also, marking module 134 may mark the difference with a label "style change". A suggestion is provided to perform a font style change to keep the font style consistent with the first web screen shot.

Difference characteristic 506 indicates a change in value after the webpage update. In the current example, the value has changed from 21 to 15. Marking module 134 may draw a rectangle around the changed value. Also, marking module 134 may mark the difference with a label "value change". In addition, a suggestion is provided to change the value to be consistent with the value in the first web screen shot. In an exemplary embodiment, a value may be any alphanumeric value.

Difference characteristic 508 indicates a change in font color after the webpage update. In the current example, the color of the font has changed from black to blue. Marking module 134 may draw a rectangle around the text of which the color has changed indicating the difference with a label "color change". In addition, a suggestion is provided to change the color of the text to a color that is consistent with the color of the text in first web screen shot.

Difference characteristic 510 indicates a missing value after the webpage update. Marking module 134 may draw a rectangle around the area in which a missing value was identified. Marking module 134 may mark to indicate the difference with a label "value missing". In addition, a suggestion is provided requesting a value that is consistent with the value of first web screen shot.

Difference characteristic 512 indicates a difference in the button selection after the webpage update. Marking module 134 may draw a rectangle around the radio buttons in which a discrepancy was identified, and indicate the difference with a label "button selection change". In addition, a suggestion is provided to change the button selection to one that is consistent with the selection of first web screen shot.

Figure 6:
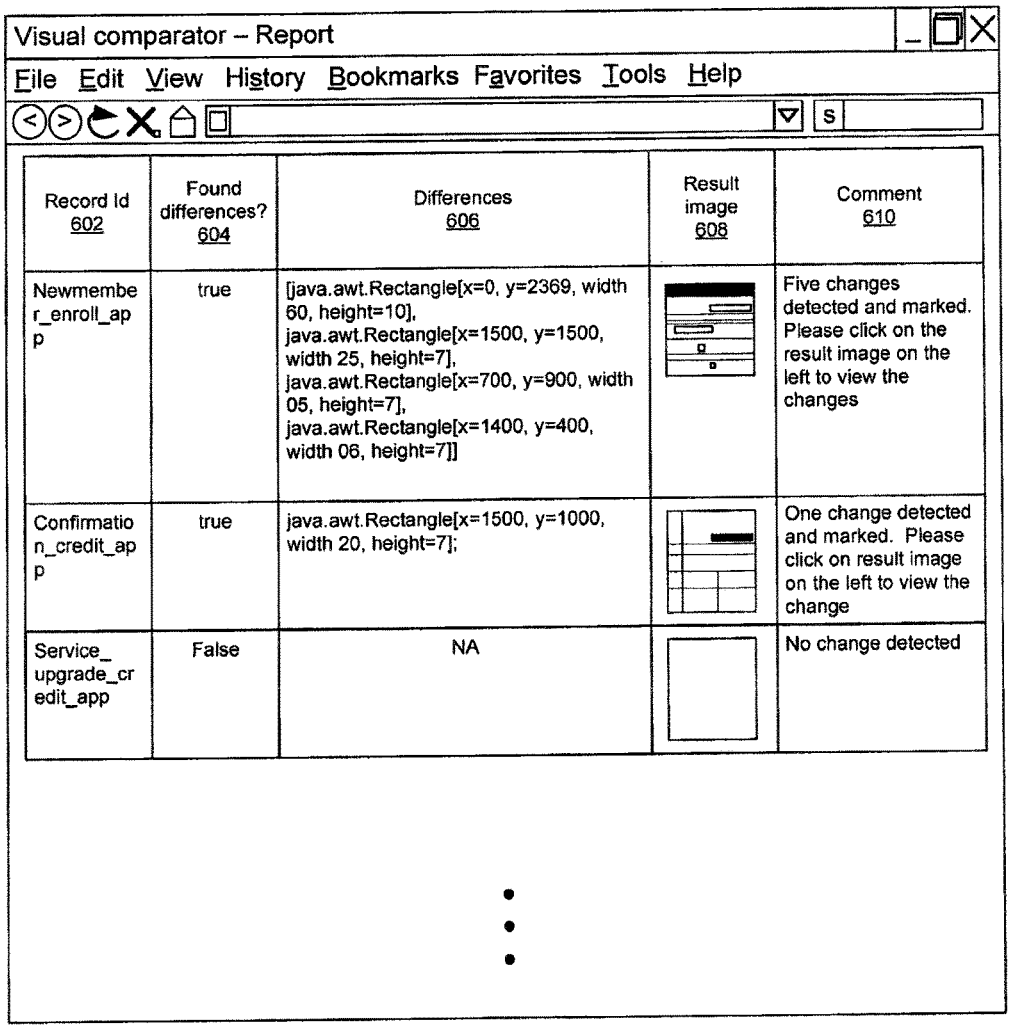
FIG. 6 is an exemplary report of marked different characteristics between the first web screen shot and the second web screen shot, according to an embodiment of the present disclosure.
Figure 7:
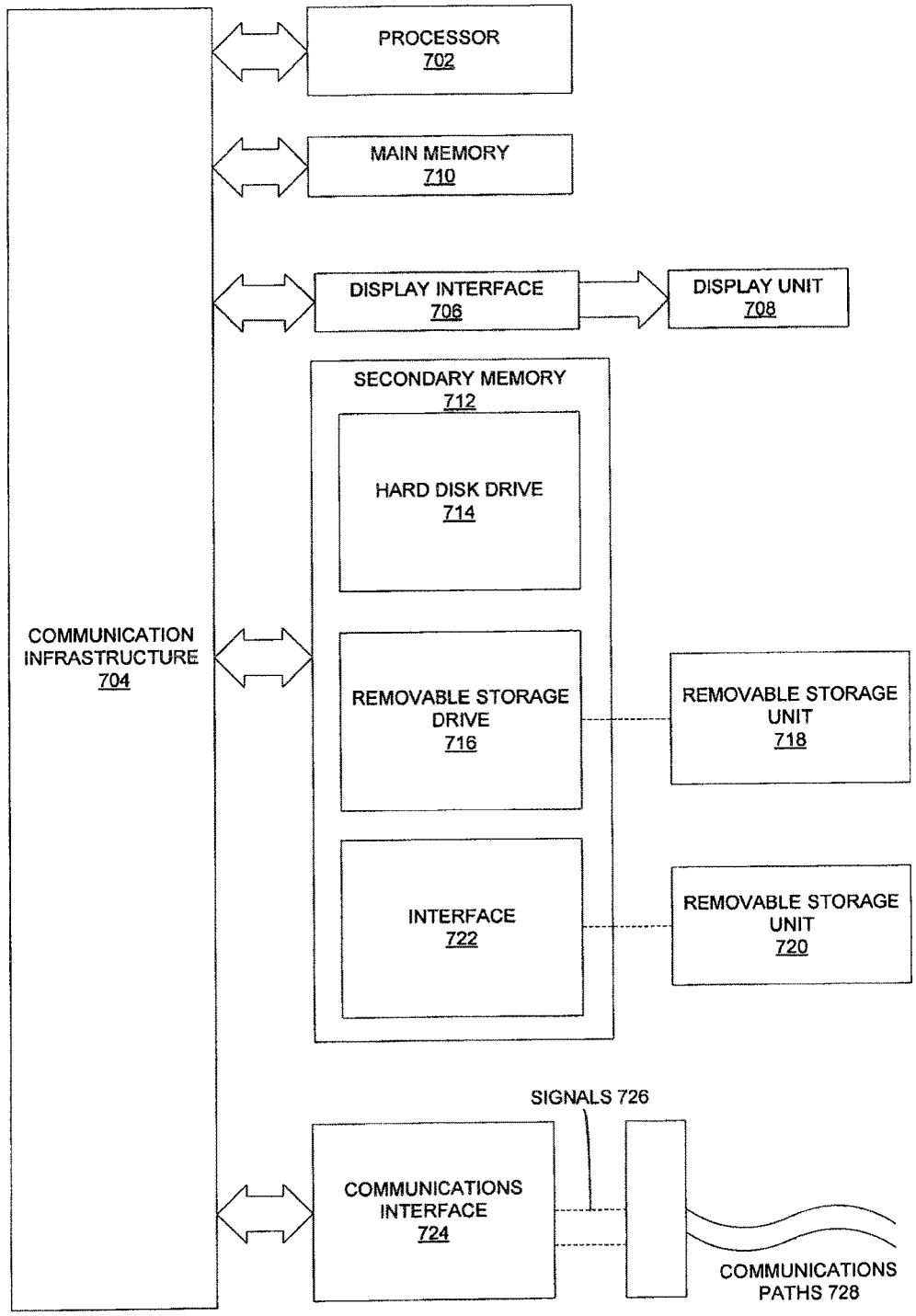
FIG. 7 is a block diagram of an exemplary embodiment of a computer system.

FIG. 6 illustrates an exemplary report 600 of the different characteristics between the first web screen shot and the second web screen shot, according to an embodiment of the present disclosure. In one exemplary implementation, report 600 includes a table having various rows, where each row corresponds to one set of tested webpage screen shots. For each tested set of screen shots, report 600 may include a record ID field 602, a found differences field 604, a differences field 606, a result image field 608, and a comment field 610.

Record ID field 602 lists identification of web pages corresponding to the screen shots for which the webpage regression test is performed. For example, "Newmember_enroll_app" in second row may be an ID of webpages underlying the screen shots illustrated in FIG. 3 and FIG. 4. Found differences field 604 lists information indicating whether there were any changes after the webpage update. In the current example, found difference field 604 illustrates a Boolean value "true" indicating that the webpage having record ID "Newmember_enroll_app" had changes after the webpage update. Differences field 606 lists the positions of the differences found in the second web screen shot in comparison with the first web screen shot. In the current example, "java.awt.Rectangle [x=0, y=2369, width 60, height=10]" indicates location of one of the differences, in terms of image coordinates, that was found in the second web screen shot after webpage update. Result image field 608 provides a miniature result image illustrating locations of changes and markings on the second web screen shot. In one exemplary implementation, the miniature result image may be embedded with a hyperlink, which when clicked provides a result webpage screen shot having marked difference characteristics. Comment field 610 lists comments such as number of changes, suggestions and/or the like associated with the particular webpage. Similar to the second row, a third row illustrates a result of webpage regression testing for a record bearing record ID "Confirmation_credit_app" associated with webpages underlying screen shots. The fourth row illustrates a result of webpage regression testing for a record bearing a record ID "Service_upgrade_credit_app". The webpage regression testing did not find any differences between web screen shots corresponding to "Service_upgrade_credit_app". Thus, the fields: found differences 604, differences 606, and result image 608, corresponding to the "Service_upgrade_credit_app" shows false, NA and a miniature empty image respectively.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims. It should be understood that the detailed description and specific examples, indicating exemplary embodiments, are given for purposes of illustration only and not as limitations. Many changes and modifications within the scope of the instant disclosure may be made without departing from the spirit thereof, and includes all such modifications. Corresponding structures, materials, acts, and equivalents of all elements in the claims below are intended to include any structure, material, or acts for performing the functions in combination with other claim elements as specifically claimed. The scope should be determined by the appended claims and their legal equivalents, rather than by the examples given above. Reference to an element in the singular is not intended to mean "one and only one" unless explicitly so stated, but rather "one or more." Moreover, where a phrase similar to at least one of A, B, and C is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The present disclosure (i.e., computer-based system 100, visual comparator 104, process 200, any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein. Rather, the operations are machine operations. Useful machines for performing the operations may include general-purpose digital computers or similar devices.

In fact, an exemplary embodiment may be directed towards one or more computer systems capable of carrying out the functionality described herein.

Computer system 700 includes at least one processor, such as a processor 702. Processor 702 is connected to a communication infrastructure 704, for example, a communications bus, a cross over bar, a network, and/or the like. Various software embodiments are described in terms of this exemplary computer system 700. After reading this description, it will become apparent to a person skilled in the relevant art(s) how to implement the present embodiments using other computer systems and/or architectures.

The computer system 700 includes a display interface 706 that forwards graphics, text, and other data from the communication infrastructure 704 for display on a display unit 708.

The computer system 700 further includes a main memory 710, such as random access memory (RAM), and may also include a secondary memory 712. The secondary memory 712 may further include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a well known manner. The removable storage unit 718 may represent a floppy disk, magnetic tape or an optical disk, and may be read by and written to by the removable storage drive 716. As will be appreciated, the removable storage unit 718 includes a computer usable storage medium having stored therein, computer software and/or data.

In accordance with various embodiments, the secondary memory 712 may include other similar devices for allowing computer programs or other instructions to be loaded into the computer system 700. Such devices may include, for example, a removable storage unit 720, and an interface 722. Examples of such may include a program cartridge and cartridge interface (such as that found in video game devices), a removable memory chip (such as an erasable programmable read only memory (EPROM), or programmable read only memory (PROM)) and associated socket, and other removable storage unit 720 and interfaces 722, which allow software and data to be transferred from the removable storage unit 720 to the computer system 700.

The computer system 700 may further include a communication interface 724. The communication interface 724 allows software and data to be transferred between the computer system 700 and external devices. Examples of the communication interface 724 include, but may not be limited to a modem, a network interface (such as an Ethernet card), a communications port, a Personal Computer Memory Card International Association (PCMCIA) slot and card, and/or the like. Software and data transferred via the communication interface 724 are in the form of a plurality of signals, hereinafter referred to as signals 726, which may be electronic, electromagnetic, optical or other signals capable of being received by the communication interface 724. Signals 726 are provided to the communication interface 724 via a communication path (e.g., channel) 728. The communication path 728 carries the signals 726 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 716, a hard disk installed in hard disk drive 714, signals 726, and/or the like. These computer program products provide software to the computer system 700. The present disclosure is directed to such computer program products.

Computer programs (also referred to as computer control logic) are stored in the main memory 710 and/or the secondary memory 712. Computer programs may also be received via the communication infrastructure 704. Such computer programs, when executed, enable the computer system 700 to perform the features as discussed herein. In particular, the computer programs, when executed, enable the processor 702 to perform the features of the various embodiments. Accordingly, such computer programs represent controllers of the computer system 700.

In accordance with an embodiment implemented using a software, the software may be stored in a computer program product and loaded into the computer system 700 using the removable storage drive 716, the hard disk drive 714 or the communication interface 724. The control logic (software), when executed by the processor 702, causes the processor 702 to perform the functions as described herein.

Another embodiment may be implemented primarily in hardware using, for example, hardware components such as application specific integrated circuits (ASIC). Implementation of the hardware state machine so as to perform the functions described herein will be apparent to persons skilled in the relevant art(s).

In yet another embodiment, an exemplary embodiment is implemented using a combination of both the hardware and the software.

While various embodiments have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages, are presented for example purposes only. The architecture is sufficiently flexible and configurable, such that it may be utilized (and navigated) in ways other than that shown in the accompanying figures.

The invention claimed is:

1. A method comprising:
comparing, by a computer-based system for webpage regression testing, characteristics of a first web screen shot of a webpage and a second web screen shot of the webpage, wherein a webpage update is implemented between the first web screen shot and the second web screen shot, and wherein the comparing includes comparing pixels in the first web screen shot to pixels in the second web screen shot by iteratively shifting regions of the first web screen shot to determine a corresponding region of the second web screen shot; and
providing, by the computer-based system and based on the comparing, a report including a modified screen shot visually indicating one or more discrepancies between the first web screen shot and the second web screen shot, wherein the report further indicates changes to the webpage that would increase matching of the first web screen shot to the second web screen shot.

2. The method of claim 1, further comprising capturing, by the computer-based system, the first web screen shot and the second web screen shot.

3. The method of claim 1, further comprising receiving, by the computer-based system, the first web screen shot and the second web screen shot.

4. The method of claim 1, further comprising marking, by the computer-based system, different characteristics between the first web screen shot and the second web screen shot, wherein the marking produces the modified screen shot.

5. The method of claim 1, wherein the one or more characteristics include one or more of the following characteristics: color, size, font, style, location, and value.

6. The method of claim 1, wherein the report regarding changing the webpage includes a suggested color change for a portion of text on the webpage.

7. The method of claim 1, further comprising configuring parameters to optimize performance of the computer-based system.

8. The method of claim 1, wherein the comparing includes:
comparing a first rectangular area of the first web screen shot to a second rectangular area of the second web screen shot; and
determining a percentage difference, wherein the percentage difference indicates a ratio of a number of pixels in discrepancy to a total number of pixels in one of the first rectangular area or the second rectangular area.

9. The method of claim 8, further comprising:
determining the rectangular size of the first rectangular area and the second rectangular area, wherein the determining the rectangular size comprises:
performing a pixel comparison of the first rectangular area to the second rectangular area; and
forming a rectangle around a grouping of pixel discrepancies.

10. The method of claim 1, wherein the comparing further includes:
iteratively shifting the first rectangular area; and
marking the differences in the second web screen shot for rectangular areas for which a match is not found.

11. The method of claim 1, wherein the computer-based system comprises a visual comparator which is a Java application programming interface (API).

12. The method of claim 1, wherein the different characteristics are at least one of color, element positioning, and content.

13. The method of claim 5, wherein the report is generated in Hyper Text Markup Language (HTML).

14. A non-transitory computer program product having computer-executable instructions stored thereon that, if executed by a computer-based system for webpage regression testing, cause the computer-based system to perform operations comprising:
comparing, by the computer-based system, characteristics of a first web screen shot of a webpage and a second web screen shot of the webpage, wherein a webpage update is implemented between the first web screen shot and the second web screen shot, and wherein the comparing includes comparing pixels in the first web screen shot to pixels in the second web screen shot by iteratively shifting regions of the first web screen shot to determine a corresponding region of the second web screen shot; and
providing, by the computer-based system and based on the comparing, a report including a modified screen shot visually indicating one or more discrepancies between the first web screen shot and the second web screen shot, wherein the report further indicates changes to the webpage that would increase matching of the first web screen shot to the second web screen shot, and wherein the report further includes suggestions regarding changing one or more characteristics of an element of the webpage in order to increase matching of the first web screen shot and the second web screen shot.

15. The product of claim 14, wherein the comparing includes:
comparing a first rectangular area of the first web screen shot to a second rectangular area of the second web screen shot; and
determining a percentage difference, wherein the percentage difference indicates a ratio of a number of pixels in discrepancy to a total number of pixels in one of the first rectangular area or the second rectangular area.

16. The product of claim 15, further comprising:
determining the rectangular size of the first rectangular area and the second rectangular area, wherein the determining the rectangular size comprises:
performing a pixel comparison of the first rectangular area to the second rectangular area; and
forming a rectangle around a grouping of pixel discrepancies.

17. The product of claim 14, wherein the comparing the first web screen shot and the second web screen shot comprises comparing visual changes occurring after the webpage update.

18. A non-transitory computer-readable medium having stored thereon instructions executable by a computer system to cause the computer system to perform operations comprising:
comparing characteristics of a first web screen shot of a webpage and a second web screen shot of the webpage, wherein the comparing includes iteratively shifting a region of the first web screen shot to determine a corresponding region of the second web screen shot, wherein a webpage update is implemented between the first web screen shot and the second web screen shot, and wherein the comparing includes comparing pixels in the first web screen shot to pixels in the second web screen shot; and providing a report based on the comparing including a modified screen shot visually indicating one or more discrepancies between the first web screen shot and the second web screen shot, wherein the report further indicates changes to the webpage that would increase matching of the first web screen shot to the second web screen shot.

\* \* \* \* \*